(12) United States Patent
Haupt et al.

(10) Patent No.: US 8,339,901 B2
(45) Date of Patent: Dec. 25, 2012

(54) DISPLAY STATION

(76) Inventors: Rolf Haupt, Chaiwan (HK); Allan McCormick, La Crescent, MN (US)

(*) Notice: Subject to any disclaimer, the term of this patent is extended or adjusted under 35 U.S.C. 154(b) by 0 days.

(21) Appl. No.: 12/057,761

(22) Filed: Mar. 28, 2008

(65) Prior Publication Data

US 2009/0067294 A1 Mar. 12, 2009

Related U.S. Application Data

(60) Provisional application No. 60/982,137, filed on Oct. 23, 2007, provisional application No. 60/982,096, filed on Oct. 23, 2007, provisional application No. 60/981,862, filed on Oct. 23, 2007, provisional application No. 61/019,299, filed on Jan. 7, 2008.

(30) Foreign Application Priority Data

Sep. 28, 2005 (DE) .......................... 10 2005 046 555
Sep. 28, 2006 (EP) ................................. 2006/009414

(51) Int. Cl.
*G04C 11/02* (2006.01)
(52) U.S. Cl. .......................................... 368/47; 368/21
(58) Field of Classification Search .................... 368/21, 368/47
See application file for complete search history.

(56) References Cited

U.S. PATENT DOCUMENTS

| 6,076,044 | A  | * | 6/2000  | Brown .............................. 702/3 |
| 6,678,215 | B1 | * | 1/2004  | Treyz et al. ..................... 368/10 |
| 6,751,164 | B1 | * | 6/2004  | Sekiguchi ....................... 368/80 |
| 6,876,600 | B2 | * | 4/2005  | Ito et al. .......................... 368/21 |
| 6,917,297 | B2 | * | 7/2005  | Andrews et al. .............. 340/601 |
| 6,967,900 | B2 | * | 11/2005 | Chapman ........................ 368/10 |
| 6,970,924 | B1 |   | 11/2005 | Chu et al. |
| 7,376,509 | B2 |   | 5/2008  | Endo et al. |
| 2002/0012290 | A1 | * | 1/2002  | Shinagawa ..................... 368/21 |
| 2003/0189876 | A1 | * | 10/2003 | Chan .............................. 368/47 |
| 2004/0249568 | A1 |   | 12/2004 | Endo et al. |
| 2005/0108213 | A1 | * | 5/2005  | Riise et al. ....................... 707/3 |
| 2005/0174889 | A1 | * | 8/2005  | Marcantonio et al. ......... 368/12 |
| 2005/0232086 | A1 | * | 10/2005 | Jiddou et al. .................... 368/47 |
| 2006/0095210 | A1 |   | 5/2006  | Chan |

OTHER PUBLICATIONS

PCT/US2008/080953, International Preliminary Report on Patentability, dated May 6, 2010.

* cited by examiner

*Primary Examiner* — Renee Luebke
*Assistant Examiner* — Jason Collins
(74) *Attorney, Agent, or Firm* — Banner & Witcoff, Ltd.

(57) ABSTRACT

A display device for deriving geographic location from a GPS signal or the Internet and cross referencing the location with a database to determine the adjustment required to display correct time regardless of time zone and daylight savings time. Thus, a device may be sold and/or transported anywhere in the country and/or world and display the current time.

21 Claims, 2 Drawing Sheets

DISPLAY STATION

This application claims priority from the PCT application EP2006/009414 (WO 2007/036360) filed Sep. 28, 2006 and published on Apr. 5, 2007 which claims priority to German patent application no. 10 2005 046 555.2-52, to Roland Baur filed on Sep. 28, 2005, both documents incorporated by reference in their entirety. This application further claims priority to U.S. provisional applications 60/982,137 entitled Method of Transmitting, Receiving and Forwarding Data in a Low Power Network System, to Allan McCormick and Rolf Haupt, filed on Oct. 23, 2007, U.S. Provisional Application 60/982,096 entitled Method of Transmitting, Receiving and Displaying/Playing Data such as Internet Radio Time, and Music on a Network System, filed on Oct. 23, 2007 to Allan McCormick and Rolf Haupt, U.S. Provisional Application 60/981,862 entitled Method and Apparatus of Transmitting, Receiving, Displaying and Playing Weather Data filed on Oct. 23, 2007 to Allan McCormick and Rolf Haupt, and U.S. Provisional application 61/019,299 Entitled Method and Apparatus of Transmitting, Receiving, Displaying and Playing Weather Data filed on Jan. 7, 2008 to Rolf Haupt and Allan McCormick, all of which are herein incorporated by reference in their entirety.

FIELD OF THE INVENTION

The present invention relates to time based display apparatus which may be useful in displaying time information, for example automatically corrected for time zone, as used in an information display such as weather stations, and in particular, a process and apparatus to operate a wireless, remotely controllable home weather station which may be configured to process various timing signals such as GPS signals to maintain accurate time zone data in display devices.

BACKGROUND OF THE INVENTION

A known weather station is from the company Reinhardt System- und Messelectronic GmbH, Bergstr. 33, 86911 Diessen-Obermühlhausen, Germany and has the product name "MWS 5 MV". See, for example, http://www.reinhardt-testsystem.de/ENEUPRO.HTM. The unit measures temperature, relative humidity, barometric air pressure, wind speed and wind direction and transfers this data as serial ASCII-data to a connected Laptop or PC or stores the data internally in a data logger memory. The weather station is mounted on a 1" water pipe or on a tripod. With the optional GPS-module, the time axis data in the data logger can be synchronized to the exact time, height, and geographical position. The memory capacity is 12 days if the data is recorded in 10 minutes intervals.

DE 198 01 688 A1 discloses a system according to which a radio signal converter receives a timing signal from a timing signal sender and sends an appropriate signal at another frequency to a timer which is located within a closed building. The frequency is selected such that this signal as opposed to the original timing signal can penetrate the building so that the timer can always be synchronized. Such an arrangement has multiple individual components. This system has a problem in that there are many places on the planet where there is no receiving for a timing signal that can be received outside a building. Insofar as a timing signal can be received, a device is required which can be adjusted to individual specific features of the timing signal in a specific momentary location area.

Generally known is a home weather station with an exterior sensor as external measurement mechanism for the measurement of or alternatively recording of weather data in the exterior ambient area of a building. By means of a transmission mechanism which is combined with a measurement mechanism, the weather data are transmitted into the building and are there received by an internal receiving mechanism. This weather data transmission is by radio signal in an appropriate data format to the receiving mechanism as an element of the home weather station which is located inside a building. The weather station comprises a display mechanism as a reproduction mechanism combined with a receiving mechanism for the optical reproduction of weather data within a building.

Devices exist for manually adjusting the time zone within a particular device. However, there is not currently known a device with can automatically adjust for time zones while receiving a wide area network signal. Ideally, a radio controlled clock or weather stations should automatically adjust for different time zones regardless of where the clock is sold in the country or world.

SUMMARY OF THE INVENTION

An aspect of the invention includes a remote controlled display device having a user interface for the reproduction of time data in optical and/or acoustically ascertainable form, a receiving device connected to the user interface including at least one processor configured to receive a common time signal across multiple time zones, to process a signal representative of a geographic location in conjunction with a database related to current time within the geographic location and to correcting the common time signal to reflect the current time within the time zone where the user interface is located.

A further aspect of the invention corrects the common time signal to reflect not only the time zone but also any daylight savings time.

A still further aspect of the invention allows for the database to be updated based on local changes in daylight savings time.

A still further aspect of the invention allows for the time signal and the geographic location signal to be derived from signals from the Internet.

Yet additional aspects of the invention provide for determining the geographic location of the user interface device using an IP address reverse lookup table or similar reverse geographic location technology either implemented locally or at a remote device to determine the geographic location of the device and using this information cross referenced to the time zone and/or daylight savings time database, correcting the displayed time on the user interface device.

Additional aspects of the invention utilize timing and/or data signals from satellite navigation related signals such as GPS signals.

In yet further embodiments, the geographic information is resolved using at least a four position timing and/or data information signal.

In still further embodiments, the position data is determined using a satellite navigation system signal, especially a GPS signal, as a receiving signal.

Additionally, aspects of the invention include using GPS related positioning data determined from a satellite navigation system signal including a specified time in the received timing data as recalculated to the particular time zone.

Deriving a time and position signal from a remote receiver outside of a structure and transmitting the derived time and position signal inside of a structure in order to correct for time zone and/or time zone and day light savings time on a user display device. The satellite receiving device may further be integrated into a weather sensing device.

The invention including an automated time zone correction and/or daylight savings time correction as implement in a weather station.

BRIEF DESCRIPTION OF THE DRAWINGS

The invention is defined in the claims appearing at the end of the present specification. Examples of certain aspects of the inventions defined by the claims are show schematically in FIG. 1 and FIG. 2.

DETAILED DESCRIPTION OF THE INVENTION

Figure 1:
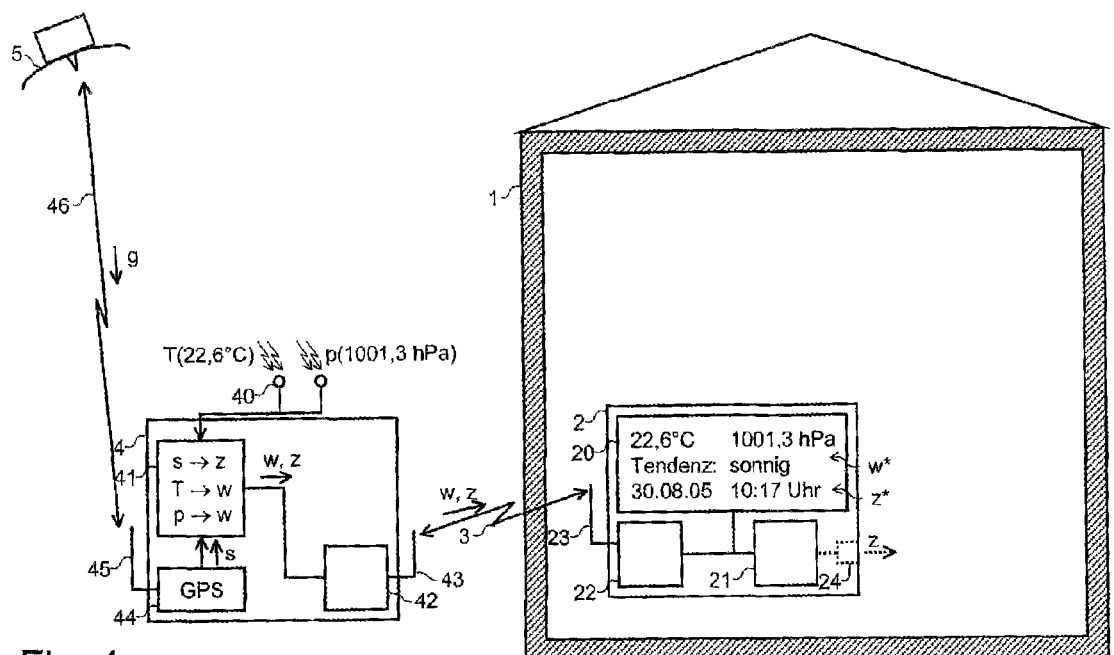
FIG. 1 illustrates schematically components of a home weather station and a timing transmission system in accordance with one embodiment of the invention.

Advantageous is thus a home display system that may be variously configured. For example, it may provide a measurement mechanism to measure and provide weather data from the ambient area. It may also provide a user interface to reproduce weather data in optical and/or acoustically comprehensible form. The device may further include a transmission mechanism to transmit the measured and available weather data, and a receiving mechanism to receive the weather data from the transmission mechanism and to make the received weather data available for the use via the user interface device. Further, the device may include a mechanism for automatically locating the current position of the device relative to time zones and daylight savings time areas in order to automatically set and correct the time. The device may receive the time over the Internet, over a satellite, and/or over a long wave transmission mechanism.

The time data as appropriately corrected is displayed by transmission from the transmission mechanism to the receiving mechanism and from the reproduction mechanism and/or display mechanism additionally or alternatively to the weather data.

Thus a home display device is to be understood as an arrangement which receives a timing signal and/or gathers weather data external to a building and transmits these into the building whereby the special layout inside the building can be arranged optically also in the form of a clock with additional weather data reproduction possibilities. As weather data, in the case of a simple arrangement, one can understand also simply just one external parameter gathered outside the building, such as temperature, without further parameters such as air pressure being gathered.

Advantageous is a home weather station in which the transmission mechanism and the receiving mechanism are designed as components to form a radio-interface. Advantageous is a home weather station in which the transmission mechanism and/or the timing signal module or the timing and/or data information in timing data is equipped with or connected to weather data. Advantageous is a home weather station in which the receiving mechanism and/or the reproduction mechanism is equipped with or connected to a processor for the transformation of timing data in a data format for weather data in reproducible timing and/or date data. Advantageous is a home weather station in which the timing signal module is equipped as a satellite navigation system model, such as a GPS module, for the receiving of a GPS signal which contains timing and/or data information.

Further advantages include using the same mechanism to transmit location, weather, and/or time information. It is advantageous to have a measurement apparatus for such a home weather station with an integrated measurement mechanism, a timing signal module, and a transmission mechanism. Advantageous is a reproduction device for such a home weather station with an integrated receiving mechanism and an integrated reproduction mechanism and/or display mechanism for the display of received timing and data information.

Further advantages according to embodiments of the methods of the invention include a process for the operation of a home weather station through which weather data are gathered and are transmitted as weather data in a weather data stream over an interface to a spatially separated reproduction mechanism whereby additionally timing and/or data signals are gathered and are transmitted as timing data by means for the transmission of weather data and/or as timing data together with weather data in weather data streams for the reproduction there or for the display there at the reproduction mechanism and/or the display mechanism. For example, time of day, position data, and weather data may all be sent from a server to a connected device. The time of day signal may be augmented by a local real time clock to keep time between time updates.

By transmission of timing data together with weather data is especially meant that the transmission takes place across the same transmission medium and the same devices. The transmission of actual data can for example take place in alternating sequences of weather data, timing data, weather data, etc. However, a combination of weather data and timing data in a shared transmission block is also possible. Additionally, for example a temporally irregular transmission is also possible during which only current timing data and through which only slowly changing weather data can be transmitted in varying intervals.

Additional embodiments have advantages where the timing data is transformed for transmission over an interface into a data format for weather data. In these embodiments it may be advantageous, on the receiver's side, to transform the timing data into a data format compatible with weather data transmission and including reproducible timing and/or data information. Additionally, four numeric positions of timing and/or data information of the timing signal may be transformed for transmission over the interface into three numeric positions of timing information. Positioning and elevation data may be established as received signals from a GPS signal by means of which relative air pressure is determined which is reproduced or displayed through the reproduction mechanism and/or the display mechanism.

Also as a further independent embodiment, there is a process through which positioning data can be ascertained as a received signal from a satellite navigation system signal by means of a specific time in the received timing data being recalculated to the particular time zone.

In embodiments where satellite navigation data is utilized to determine the location, the time can be recalculated to the particular time zone. Navigation satellites send the time usually as world time UTC (Universal Time Counting). Until now the correction to a local time has been accomplished by manual adjustment of the time zone. An automatic calculation and correction of the time zone is possible through positioning data and is advantageously converted and implemented by embodiments of the invention.

The invention includes a combination of both of these systems whereby the weather system is broadened by functionality and components to receive a timing signal. A timing signal thus received may additionally be transmitted over the existing radio path and is displayed or output as supplemental information on the weather station's display. It has in addition proven useful to transform the timing signal in order to be able to transmit it by means of a more ordinary compact data format.

Referring to FIG. 1, an exemplary home weather station is shown having two independent components which are connected with each other over a transmission path. While a cable or hardwired connection may be utilized, many embodiments utilize a radio interface as a preferred transmission path.

The external mechanism may include one or more sensors as measurement mechanisms to gather weather data such as, for example a temperature of for example 22.6° C. or a pressure of for example 1001.3 hPa. The values or signals gathered by the measurement mechanisms and/or by received satellite signals may be fed into a processor for processing and performing calculations. The values are transformed by the processor for example, in an appropriate data format compatible to be sent in the same or similar transport stream as the weather data. The transmission mechanism may be configured to transmit the weather data over an antenna and a radio interface to the internal device. The processing may occur at the external or internal device.

In addition, the external device may include a timing signal module which receives, for example, via an antenna and/or a further radio interface one or more signals from a distant transmitter. The signals from the distant transmitter may include such data as current momentary timing and other data information. The transmitter is, for example, a so-called DCF timing signal transmitter for the supply of remote controlled watches with an exact timing signal. Because such a timing signal of a DCF transmitter is, however, not available everywhere, a transmitter may be included which transmits a satellite navigation signal such as a GPS signal (GPS: Global Positioning Signal) to locally connected devices including clocks or watches located proximate to the transmitter. In alternate embodiments, the timing signal module may be designed as a satellite navigation system module such as a GPS module.

The timing signal module extracts from the received signal the timing and/or data information and transmits this as a timing signal to, for example, the guidance device. The guidance device may be configured to transform the obtained timing signal into an appropriate data format which preferably corresponds to the data format of the weather data or other associated data for easy transmission using the same facilities as already utilized for the display device. Further, the guidance device may be configured to transmits aside from the weather data timing data whereby the timing data comprise the timing and/or data information such as data from a GPS receiver. Optionally, naturally also the timing signal module can make the timing data available.

The internal device may be variously configured but may include a reproduction mechanism for the audio and/or visual reproduction of the time, date, and/or weather data obtained, for example, over the radio interface. Preferably, the reproduction mechanism is designed as a display mechanism for the display of optical weather data, date, time, and/or as the occasion arises, additional information such as additional information relating to weather including weather trends or forecasts of future conditions. Principally, the reproduction mechanism can alternatively or additionally enable an acoustic reproduction such as in the form of spoken weather data.

Additionally, the reproduction mechanism such as a user interface device may be designed for the display of time and/or data information which is received as timing data over the radio interface from the external mechanism. Thereby a constantly correct time and/or data information is displayed which is not falsified by adjusting a base value and counting up by means of a possibly incorrectly clocked time rhythm provider. Further, the device may be sold anywhere in the country/world and always be displaying the correct time in the store and/or when first installed.

According to ordinary ways and means the internal mechanism is also a guidance mechanism for the distribution of the received weather data w and the timing data so that this can be reproduced through the reproduction mechanism. Furthermore, the internal mechanism comprises receiving mechanism with an antenna for the receiving of weather data and timing data over the radio interface. The data thus received from the receiving mechanism is guided to the guidance mechanism for further processing.

Optionally, the guidance mechanism can show a further interface, over which the weather data and/or the timing data can be transmitted to a separate mechanism such as a computer. However, in the most preferred embodiments, the weather data is displayed on a battery powered easily portable device.

Both the internal device and the external device are represented each as a single unit with several integrated components. Alternatively, however, a splitting into several individual components is possible. For example, the external mechanism can comprise the stand-alone network mechanism and a stand-alone timing signal module both of which on the other hand are connected to a stand-alone transmission mechanism. Correspondingly, internal mechanism can be designed from stand-alone reproduction mechanism and stand-alone receiving mechanism which are connected together.

Further, a guidance mechanism can also be designed as a stand-alone mechanism, or more preferably as an integrated mechanism, in combination with one or more of the other mechanisms. Thus, for example, in the external mechanism, a guidance mechanism can already be integrated which simultaneously comprises the transmission mechanism for the weather and timing data and, where necessary, the receiving mechanism for the signal g of transmitter. The internal mechanism can be designed such that individual or several of the described components are designed through an integration of functions and structural units in a single component.

An essential aspect of the embodiment of both the external weather data w is also the external timing and/or data information in the external mechanism and their transmission preferably over the radio interface to the internal mechanism. In this manner, timing and/or data information may be made available to the internal mechanism as timing data. Correspondingly, for the transmission over the radio interface or another transmission medium a means for data transmission is selected which, for example, can penetrate the masonry of building in order to also provide an internal mechanism with timing data z which otherwise could not be received due to the shielding of the internal mechanism from the external timing transmitter. Thus, this embodiment has the advantage of exploiting the ability to combine a home weather station or similar display device which is designed for such transmission purposes with the transmission of data designed to determine the location of the display device. Correspondingly, such a home weather station can be have added on to it appropriate components and/or data information and by components and/or functions for their transmission over the radio interface 3.

Multiple variations and multiple alternative embodiments can be implemented. In addition to the combination of a GPS receiver as the timing signal module with a weather sender, for example also integration with a GPS receiver antenna in the weather transmitter is a further embodiment. Additional implementations include a connection for a set off external GPS antenna to such a weather transmitter over an HF switching device. In embodiments, it may be useful to calculate the time from the GPS data stream of the transmitter which is normally used for the determination of positioning. For this a stand-alone processor or an already existing processor of the weather transmitter/display device may be used which transmitter may be designed to form the measurement mechanism and/or the transmission mechanism. Through the transmission mechanism correspondingly a pseudo weather data packet may be transmitted to the internal mechanism which may comprise, aside from weather data, timing data.

In a preferred way, a determination of elevation of the external mechanism can be performed when a GPS module is present as a timing signal module so that, with the aid of the elevation information extracted from the signal of transmitter, an actual relative air pressure can be established using one or more of the processors. This elevation measurement may increase the accuracy of weather predictions. Such relative air pressure can then also be transmitted to the internal mechanism as supplemental or as the occasion requires alternative information in addition to the measured air pressure data. Principally, it is also possible to merely gather such types of raw data through the external mechanism and to transmit this data to the internal mechanism so that a corresponding processing of the gathered raw data takes place only in a processor of the internal mechanism.

Transmitters of weather data conventionally send information about temperature, humidity, rain amounts, air velocity, air direction and possibly also other data. This data is thus packed in data packages and transmitted to the receiving mechanism. In order to simplify the structure of the receiving routine in the processor at the receiving end and to be in the position to also evaluate the received protocol also with a slow processor, such as 4-bit processors, it is helpful if all data packets have the same format. That is, independent from which information is transmitted, always the same amounts of bits are transmitted over an interface. Upon receipt of the fixed bit number, the receiving end can then evaluate what type of data are involved. Thereby it is advantageously avoided that the data must also be evaluated during receiving in order to determine how many bits are to be expected. If the transmission mechanism is used for weather data w in order to transmit a time or as the occasion arises a timing data, then it is of great advantage to compromise the timing data in such a manner and/or to transform them that it in the end has the same data format as the weather data and can be therefore transmitted as a weather data packet.

In connection with a possible way of processing the transformation of weather and timing information into weather data and timing data, it is assumed that numbers with only three positions can be transmitted over the interface.

A temperature of for example 22.6° C. is represented as a number with three positions. This means that 3 nibbles or alternatively 12 bits may be transmitted because 1 nibble has 4 bits and can represent a hexadecimal number. Correspondingly a humidity of for example 45.3% RH can be represented as a number with 3 positions which again is transmitted with 3 nibbles or alternatively 12 bits. Furthermore, for example an amount of rain or a wind velocity and/or after corresponding transformation an air pressure can be transmitted in the form of a three position counter status by means of 3 nibble or alternatively 12 bit.

A time, such as 22:57, has on the other hand four positions and can therefore not be integrated directly into an exemplary data packet for three position numbers. In these embodiments, the time may therefore be packed or alternatively transformed as described below. If the value of the decimal hour equals the null value, the decimal hour is eliminated whereas otherwise nothing is done. This means that 02:57 becomes 257. If the value of the decimal hour equals the value one, then the decimal hour is eliminated and the value A hexadecimal is added to the decimal minutes. This means that 12:57 becomes 2F7 or alternatively 5+0A hex=0F hex. If the value of the decimal hour equals the value two, then the decimal hour is eliminated and the value A hexadecimal is added to the unit hour. This means that 22:57 becomes C57 or alternatively 2+0A hex=0C hex.

The unpackaging at the receiving end is correspondingly carried out as described below. If none of the three transmitted numbers is greater than the value nine, then merely the null value is entered as the decimal hour. This means that 745 becomes 07:45. If the first position is greater then the null value, then the value A hexadecimal is subtracted from this digit and a two is entered as the decimal hour. This means that D51 becomes 23:51 with 0D hex−0A hex=3. If the second position is greater than the value nine, then the value A hexadecimal is subtracted from this position and a one is entered as the decimal hour 1. This means that 2F3 becomes 12:53 with 0F hex−0A hex=5.

Fundamentally however other packaging processes can be conceived of in order to transform the time into an appropriate data format, for example if another data format with more or less than 3 nibbles is selected for the weather data. The use of the described packaging process is therefore not necessarily required but is merely an exemplary preferred process. To avoid for example several transmission frequencies or an expensive guidance process it is preferred that the timing data are somehow made available in a data format or can be correspondingly transformed so that they can be sent in the same manner as the weather data packets.

Figure 2:
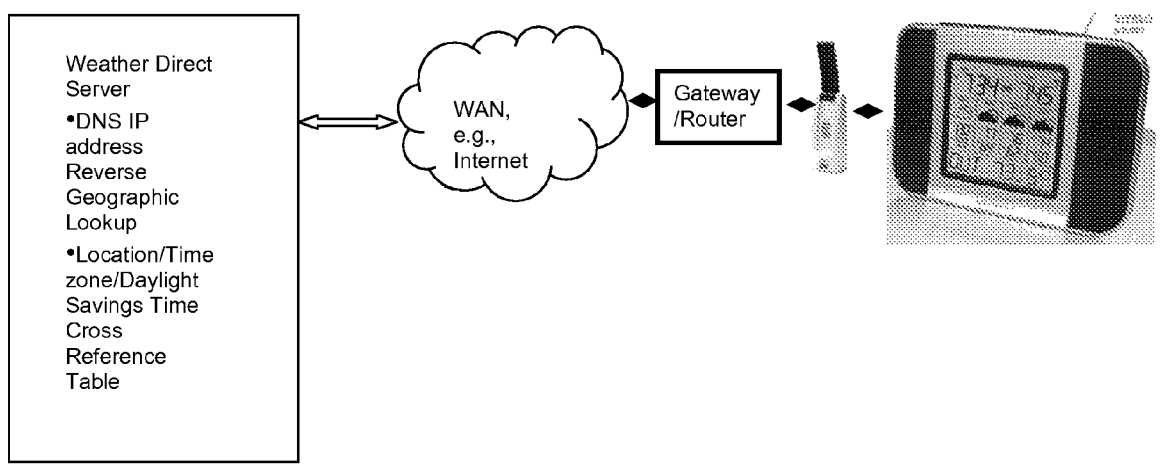
FIG. 2 illustrates a second embodiment of a home display station in accordance with another embodiment of the invention.

An alternate embodiment is shown in FIG. 2 as an wide area network (e.g. Internet) connected system. In this embodiment, the position data of the weather station device 108 may be determined either at the weather station device 108 or alternatively back at the Weather Direct™ Server 101. The weather station server 101 may communicate via the WAN e.g., the Internet 102, a gateway or router 103 and/or one or more wireless devices 104. For example, known reverse lookup geographic location routines may be utilized to perform a reverse lookup on the DNS address to determine the geographic location of the connecting device. While this method may not provide sufficient geographic resolution to determine a location within a few feet, it is sufficient to determine the location of the device relative to a time zone and/or daylight savings time location. Thus, software on the server performs the reverse lookup and then configures the user's profile to indicate a particular time zone and daylight savings time configuration. Thereafter, the user's device is automatically updated with the correct data for its location without the user actually performing any setup whatsoever. This is advantageous for older or less technically savvy users who simply want to plug in their weather direct wireless module into the router and hand the receiver on the wall without any configuration. The reverse lookup mechanism makes this possible.

The invention claimed is:

1. A method, comprising:
receiving, by a receiver device, timing information via a common time radio signal transmitted across a plurality of time zones by a remote radio transmitter;
receiving, by the receiver device, weather data;
storing the received weather data in a weather data format;
determining, by the receiver device, a current location of the receiver device;
converting the timing information received via the common time radio signal, by the receiver device, into a current local time based on the determined current location of the receiver device;
transforming the received timing information into the weather data format;
packetizing the weather data and the timing information into a plurality of data packets having a same packet format;
transmitting the plurality of data packets of weather data and timing data to a display associated with the receiver device;
displaying the converted current local time on the display associated with the receiver device; and
displaying the received weather data on the display associated with the receiver device.

2. The method of claim 1, wherein determining the current location of the receiver device comprises:
executing a network query based on a network address associated with the receiver device, wherein the network query is a reverse lookup.

3. The method of claim 1, wherein determining the current location of the receiver device comprises:
executing a network query based on a network address associated with the receiver device, wherein the network address is an internet protocol (IP) address, and wherein the network query is a reverse DNS lookup.

4. The method of claim 1, wherein the common time radio signal is a DCF timing signal.

5. The method of claim 1, wherein transforming the received timing information into the weather data format comprises:
converting the timing data from four decimal numbers into three hexadecimal numbers.

6. The method of claim 1, wherein receiving the weather data comprises at least one of:
receiving the weather data from a weather sensor integrated into the receiver device; or
receiving the weather data from a remote weather data server.

7. The method of claim 1, further comprising:
determining current elevation data for the receiver device, wherein the displayed weather data is based on the determined current elevation data for the receiver device.

8. An apparatus, comprising:
one or more processors; and
memory storing computer-readable instructions that, when executed by the one or more processors, cause the apparatus to:
receive timing information via a common time radio signal transmitted across a plurality of time zones by a remote radio transmitter;
receive weather data;
store the received weather data in a weather data format;
determine a current location of the apparatus;
convert the timing information received via the common time radio signal into a current local time based on the determined current location of the apparatus;
transform the received timing information into the weather data format;
packetize the weather data and the timing information into a plurality of data packets having a same packet format;
transmit the plurality of data packets of weather data and timing data to a display associated with the apparatus;
display the converted current local time on the display associated with the apparatus; and
display the received weather data on the display associated with the apparatus.

9. The apparatus of claim 8, wherein determining the current location of the apparatus comprises:
executing a network query based on a network address associated with the apparatus, wherein the network query is a reverse lookup.

10. The apparatus of claim 8, wherein determining the current location of the apparatus comprises:
executing a network query based on a network address associated with the apparatus, wherein the network address is an internet protocol (IP) address, and wherein the network query is a reverse DNS lookup.

11. The apparatus of claim 8, wherein the apparatus is communicatively coupled to a network router connected to the Internet.

12. The apparatus of claim 8, wherein transforming the received timing information into the weather data format comprises:
converting the timing data from four decimal numbers into three hexadecimal numbers.

13. The apparatus of claim 8, the memory storing additional computer-readable instructions that, when executed by the one or more processors, cause the apparatus to:
determine current elevation data for the apparatus, wherein the displayed weather data is based on the determined current elevation data for the apparatus.

14. A method, comprising:
receiving, by a receiver device, timing information via a common time radio signal;
receiving, by the receiver device, weather data;
storing, by the receiver device, the received weather data in a weather data format;
transforming, by the receiver device, the received timing information into the weather data format;
packetizing, by the receiver device, the weather data and the timing information into a plurality of data packets having a same packet format; and
transmitting, by the receiver device, the plurality of data packets of weather data and timing data to a display associated with the receiver device.

15. The method of claim 14, wherein transforming the received timing information into the weather data format comprises:
converting the timing data from four decimal numbers into three hexadecimal numbers.

16. The method of claim 14, wherein receiving the weather data comprises at least one of:
receiving the weather data from a weather sensor integrated into the receiver device; or
receiving the weather data from a remote weather data server.

17. The method of claim 14, further comprising:
determining current elevation data for the receiver device, wherein the received weather data is based on the determined current elevation data for the receiver device.

18. An apparatus, comprising:
one or more processors; and
memory storing computer-readable instructions that, when executed by the one or more processors, cause the apparatus to:
- receive timing information via a common time radio signal;
- receive weather data;
- store the received weather data in a weather data format;
- transform the received timing information into the weather data format;
- packetize the weather data and the timing information into a plurality of data packets having a same packet format; and
- transmit the plurality of data packets of weather data and timing data to a display associated with the apparatus.

19. The apparatus of claim 18, wherein transforming the received timing information into the weather data format comprises:
converting the timing data from four decimal numbers into three hexadecimal numbers.

20. The apparatus of claim 18, wherein receiving the weather data comprises at least one of:
- receiving the weather data from a weather sensor integrated into the receiver device; or
- receiving the weather data from a remote weather data server.

21. The apparatus of claim 18, the memory storing additional computer-readable instructions that, when executed by the one or more processors, cause the apparatus to:
determine current elevation data for the apparatus, wherein the received weather data is based on the determined current elevation data for the apparatus.

* * * * *